United States Patent [19]

Weber

[11] 4,035,583

[45] July 12, 1977

[54] METHOD TO APPLY AND DISCONNECT A 16 KHz SIGNAL TO A TELEPHONE LINE WITHOUT PRODUCING CLICKS

[75] Inventor: Vernon F. Weber, Elmhurst, Ill.

[73] Assignee: GTE Automatic Electric Laboratories Incorporated, Northlake, Ill.

[21] Appl. No.: 682,875

[22] Filed: May 3, 1976

[51] Int. Cl.² .................................... H04M 15/12
[52] U.S. Cl. ........................................ 179/7.1 R
[58] Field of Search ........... 179/7 R, 7 MM, 7.1 R, 179/7.1 TP, 2.5 R, 2.5 A, 84 R, 6.3 R, 1 D; 331/172, 173, 153, 117

[56] References Cited

U.S. PATENT DOCUMENTS

| | | | |
|---|---|---|---|
| 3,089,000 | 5/1963 | Burgener | 179/84 R |
| 3,156,883 | 11/1964 | Wells | 179/84 R |
| 3,456,083 | 7/1969 | Van der Veen | 179/84 R |

*Primary Examiner*—Kathleen H. Claffy
*Assistant Examiner*—Gerald L. Brigance

[57] ABSTRACT

A tone generator which is always connected across a line and which can gradually increase or decrease its output amplitude. This is accomplished by the use of a tickler winding type of oscillator with a resonant frequency determining network connected to one winding. The frequency determining network is arranged with a high resistance shunt that is further shunted when the tone is to be removed.

5 Claims, 2 Drawing Figures

4,035,583

METHOD TO APPLY AND DISCONNECT A 16 KHz SIGNAL TO A TELEPHONE LINE WITHOUT PRODUCING CLICKS

BACKGROUND OF THE INVENTION

1. Field of the Invention

This invention relates to a tone generator for applying bursts of tone to a telephone line to operate metering equipment at the user's site 2. Description of the Prior Art In telephone or like systems concerned with public telephones of the type in which the number of calls completed by a subscriber or the number of unit values represented by such calls is recorded on some type of register device at the office as the basis for rendering accounts. It is often desirable in such systems to have the subscriber aware of such recording as it progresses. This feaure is especially desirable in hotels, where the user must render his accounting prior to leaving the premises.

Such systems are often referred to as Periodic Pulse Metering systems. In such an arrangement, where the subscriber is to be informed, an originating junctor sends out a 120 millisecond pulse of 16 KHz to the calling telephone in order to operate a recording device in the telephone. The rate at which these tone pulses are transmitted depends on the toll charges. Thus the subscribers are aware of these charges on their own premises. Also coin telephones are arranged to collect coins in amounts representative of the call units in response to the received 16 KHz tone signals.

However when the 16 KHz signal is applied to the line, an audible click is heard in the calling telephone; when the tone is removed, another click is heard. This appears baffling since the telephone has an upper frequency response limit of only 4 or 5 KHz.

An explanation for this effect is offered in "Radiotron Designer's Handbook", 4th Edition, page 300, in relation to vacuum tubes — "An even function wave is produced by the distortion introduced by valves."

This function is:

$$F(\theta) = Bo/2 + B1 \cos \theta = B2 \cos 2\theta + B3 \cos 3\theta +$$

where $Bo/2$ is a constant which is zero if the wave is balanced about the $x$ axis. Its value is the average value of the $y$ component over one cycle. Therefore, even if the total harmonic distortion is very small, the $Bo/2$ component still exists. This direct current component attracts the diaphragm in the telephone receiver, causing the first click. When the 16 KHz is removed, the diaphragm snaps back to its reset position, causing the second click. The loudness of the click depends on the amplitude of the 16 KHz signal.

This action, the presence of a DC component from a sine wave, can be verified experimentally for example by connecting a type 412A Hewlett Packard DC Vacuum Tube voltmeter to the output of a Hewlett Packard 200AB test oscillator via a 0.0047 mfd capacitor. When the oscillator is set to 16 KHz and 2.5 VRMS the DC millivoltmeter reads 0.05 mV. At 5.0 VRMS, the meter reads 0.18 mV; at 10 VRMS, the meter reads 0.65mV. This shows that there is a DC component in the output of the test oscillator even though a DC blocking capacitor is used. The presence of this DC component is not a new phenomenon, it existed in prior systems when dial tone, ringback tone, busy tone, TCMF tones and others were switched on and off. But in these prior applications it was masked or overwhelmed by the sound produced by the telephone receiver. In the 16 KHz application the telephone receiver does not produce a 16 KHz sound so that the clicks are heard distinctly. Further, the trend is to longer lines in the telephone systems with a higher resistance ncessitating the use of higher voltages for the tone thus increasing the volume of the click on the shorter lines.

SUMMARY OF THE INVENTION

Accordingly it is an object of the present invention to provide an improved arrangement for applying and removing a tone to a communication line whereby audible clicks are eliminated.

It is another object of the present invention to provide an arrangement for attenuating a tone signal without introducing substantial distortion of the signal wave form.

It is a further object of the present invention to provide a tone source wherein the duration of each tone interval applied to a communication line can readily be controlled by conventional means available in a communication office.

Thus, in accordance with this invention, there is provided a tone generator which is always connected across the communication line, and which gradually increased its amplitude and its frequency when a tone pulse was required. At the end of the tone pulse, the amplitude and frequency gradually decreased.

BRIEF DESCRIPTION OF THE DRAWINGS

For a more complete understanding of the invention, reference is made to the drawings in which.

DESCRIPTION OF THE PREFERRED EMBODIMENT

Figure 1:
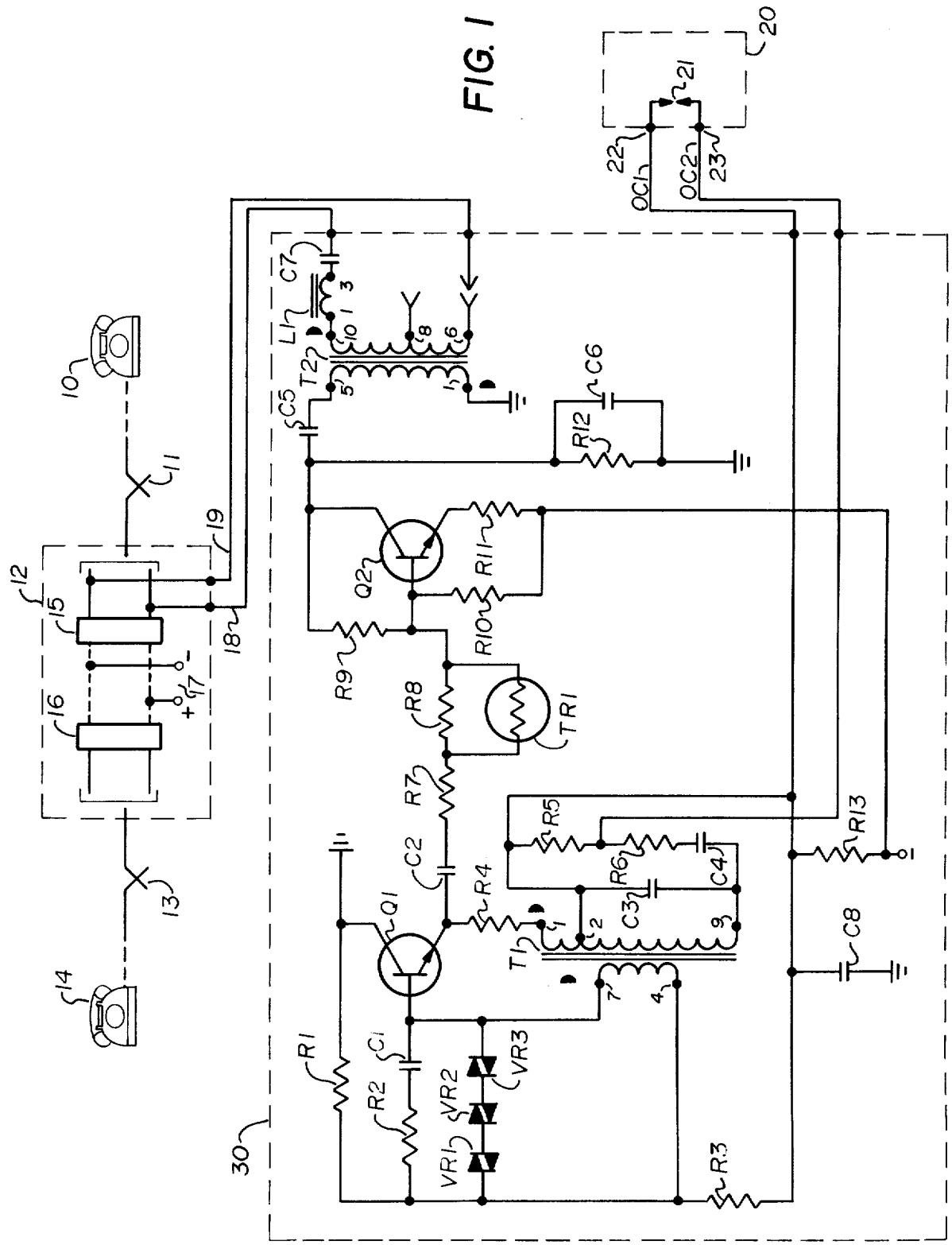
FIG. 1 is an electrical schematic diagram illustrating a concept of the invention in a simplified environment.

Referring now to FIG. 1 of the drawing there is shown in schematic form an embodiment of the invention in a greatly simplified telephone system. In the upper portion is shown a calling subscriber station 10 connected via a first switching matrix 11, a metering junctor 12 and a second switching matrix 13 to a called station 14. The calling station 10 line terminals are connected within the junctor 12 to a battery feed relay 15 and to the tone circuit 30 via conductors 18 and 19. The calling and called stations are supplied with talking battery at terminals + and − at 17 from a source not shown, via their respective battery feed devices 15 and 16. The tone circuit 30 is essentially an oscillator consisting of transistor Q1 with the frequency determining portion consisting of the windings 2–9 of transformer T1 in parallel with capacitor C3 to oscillate at 16 KHz. The collector of transistor Q1 is connected to ground potential, while the base is provided an operating bias by the voltage divider consisting of resistors R1 and R3 connected between ground and battery potential via resistor R13 respectively. The junction of the R1 and R3 resistors is connected to the base of transistor Q1 via the series path of resistor R2 and capacitor C1 both in parallel with the group of series connected voltage regulators VR1, VR2 and VR3 and the feedback winding 4–7 of transformr T1. The voltage regulators V1 through V3 act as an AC regulator across the winding 4–7. The emitter of transistor Q1 is connected to battery potential via resistor R4, winding 1–2 of transformer T1 and resistor R13.

The output of transistor Q1 is taken from its emitter via capacitor C2, resistor R7 and the parallel connected resistor R8 with temperature sensitive resistor TR1 to the base of amplifying transistor Q2. The collector of transistor Q2 is connected to ground potential via resistor R12 shunted by capacitor C6, while the emitter is connected to the battery source via resistor R11. Bias for the base of transistor Q2 is provided by the voltage divider consisting of resistors R9 and R10 connected from the collector of transistor Q2 to battery. The output is taken from the collector of transistor Q2 via capacitor C5 to the winding 5–1 of transformer T2. The output of the line terminals T and R is from the winding 10–6 via a filter consisting of inductor L1 and capacitor C7. This circuit is tuned to 16 KHz, and readily passes the 16 KHz signals, but offers a high impedance to the voice frequencies. Thus the generator can be connected across the tip and ring conductors of a line at all times. Tap 8 of transformer T2 is used in place of terminal 6 when a lower output voltage is required.

Figure 2:
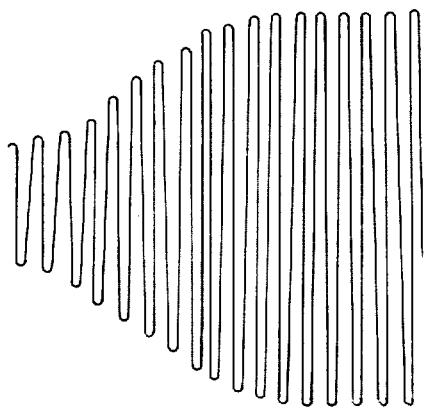
FIG. 2 is a graph of the voltage of the tone as a function of time during initial application.

The frequency determining part of this oscillator circuit winding 2–9 of T1 and C3 form a parallel resonant circuit which oscillates at 16 KHz. If resistors R5 and R6 which are in series with capacitor C4 across the resonant circuit were shorted out, C4 would be in parallel with C3, and the circuit would oscillate at 14 KHz. However when R5 and R6 are not shorted, their combined resistance is so high that the effect of C4 is negligible, and the circuit oscillates at 16 KHz. When output control leads OC1 and OC2 are connected together, R5 (100 KΩ) is shorted out, but R6 (100Ω) is still in series with C4. The frequency starts to decrease towards 14 KHz, but the 100Ω in series with C4 reduces the "Q" of the circuit so that the oscillations gradually die out. The net result is that the frequency and amplitude gradually decrease. When the connection between OC1 and OC2 is opened, the reverse is true, the frequency and amplitude gradually increase to their steady state values. Thus the click problem is solved by this tone generator which is always connected across the line, and which gradually increases its amplitude and its frequency when a tone pulse is required. At the end of the tone pulse, the amplitude and frequency gradually decrease. FIG. 2 shows that the amplitude rise times at turn on is about 4 msec. The frequency amplitude decreases during turn off in a similar manner. This combination of changing frequency and amplitude prevents clicks.

What is claimed is:

1. A signal generator for applying a tone to a communication line comprising: an oscillator means for producing a sinusoidal voltage wave of a predetermined frequency and a frequency selective filter between said oscillator and said line, said oscillator means including a resonant circuit, a series resistance and capacitance shunting said resonant circuit, and means to vary the resistance of said shunt to cause said oscillator to start and cease oscillation as said shunt resistance is increased or decreased.

2. A signal generator for applying a tone via an output to a communication line comprising: an oscillator means for producing a sinusoidal voltage wave of a predetermined frequency and a frequency selective filter between said oscillator and said output, said oscillator means including a resonant circuit, a series high resistance and capacitance shunt connected across said resonant circuit, and control means to decrease the resistance of said shunt, to cause said oscillator to gradually cease oscillation.

3. A signal generator as claimed in claim 2 wherein said high resistance shunt comprises a pair of resistors in series and said control means comprises a pair of contacts operated to shunt one of said pair of resistors.

4. A signal generator as claimed in claim 2 wherein said oscillator includes an amplifying means and a resonant circuit that comprises a transformer having a pair of windings and a capacitor across one of said windings, the other of said windings connected as a feedback to said amplifying means.

5. A signal generator as claimed in claim 4 wherein said oscillator includes voltage regulating means connected across the other of said pair of windings.

* * * * *